July 9, 1940.  J. P. SOUHART  2,207,305
ADDITIONAL IMPELLING DEVICE FOR CYCLES AND LIKE VEHICLES
Filed July 23, 1938
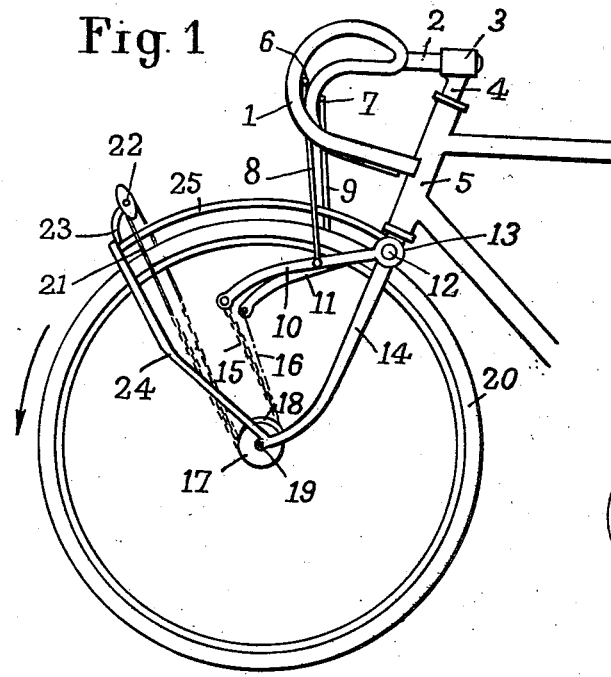
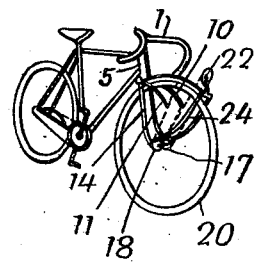
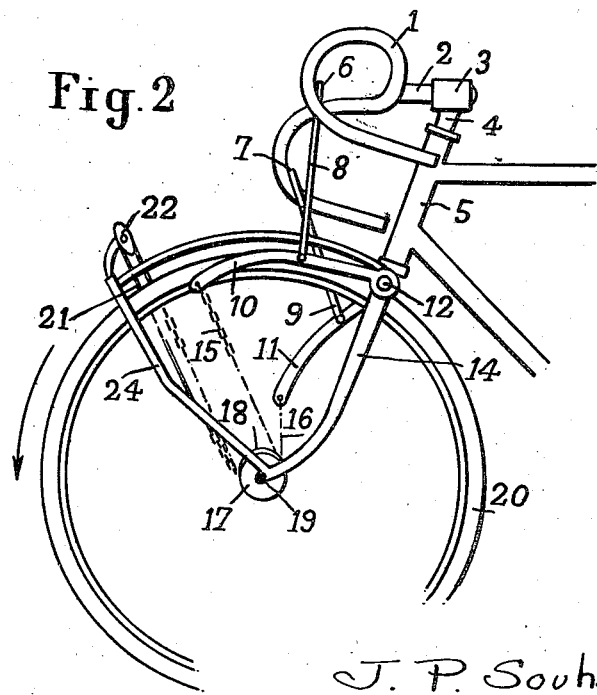
J. P. Souhart
Inventor
By: Glascock Downing & Seebold
Attys Patented July 9, 1940

2,207,305

UNITED STATES PATENT OFFICE 2,207,305

ADDITIONAL IMPELLING DEVICE FOR CYCLES AND LIKE VEHICLES

Jacques Paul Souhart, St. Cloud, France

Application July 23, 1938, Serial No. 220,977
In France July 26, 1937

2 Claims. (Cl. 280—234)

This invention relates to an additional impelling device for cycles and like vehicles.

The propulsion of bicycles and similar vehicles is obtained generally speaking by means of pedals which actuate through a convenient transmission gear the rear wheel of the vehicle which alone is driving the vehicle. The cyclist simply takes a leaning point upon the handle bar which is used for steering said vehicle. It is the same for nautical vehicles which are actuated for instance by means of a screw propeller, the arms of the cyclist being only used for stabilizing said cyclist, and for controlling the steering of said vehicle.

The device according to this invention comprises in combination with a bicycle or similar vehicle, a handle bar which may swivel in its supporting bracket and which is connected by means of convenient transmission gears eventually through convenient movement transforming parts with one or the other wheel of the vehicle with a view to allow, by a swivelling movement of said handle bar, imparting to said vehicle a motive impulsion which adds the impulsion generally obtained by means of pedals or which even may substitute for the same.

In the accompanying drawing which shows as an example of a preferred embodiment of said invention, a constructional form of an impelling device for a road bicycle—

Figs. 1 and 2 show in two different positions the device according to the said invention, Fig. 3 is a perspective front view of a bicycle equipped with the device according to this invention and shown in Figs. 1 and 2.

The handle bar 1, of any convenient shape, reinforced or not, is connected with a short horizontal shaft 2 journalled in the head 3 of the bracket 4 which is located as usual in the steering head tube 5 of the bicycle of which the front part only is shown in Figs. 1 and 2.

On the branches of the handle bar 1 are provided ball joints 6, 7, which accommodate connecting rods 8, 9, respectively, which through their other ends are connected with levers 10, 11. Said levers 10, 11 are pivoted on a common transversal shaft 12 which is journalled in a bearing 13 of the fork 14. Connected with the free ends of said levers 10, 11, are flexible transmission parts such as chains 15, 16, which respectively mesh with one way clutch wheels 17, 18, which are arranged on the shaft 19 of the front bicycle wheel 20. The chain parts 15, 16, after having passed over their respective pinions 17, 18, are attached on the ends of a cable 21 passing over a pulley 22 which is journalled on the end of an arm 23 secured in a convenient position by lateral arms 24 and a bracket 25, which latter is itself secured on a fork 14.

The operation is as follows:

At rest, the parts occupy the position shown in Figs. 1 and 3, the two branches of the handle bar 1 being at the same level, and the cyclist being in a position as usual to take a leaning point upon said bar and using same for steering his bicycle. When the cyclist desires to increase his impelling power by bringing a help to the effort exerted by his legs upon the pedals, he alternately exerts on each of the branches of the handle bar 1 a traction and a depression thus communicating to the said bar a movement of transverse swivelling or of partial rotation alternately in one direction and in the opposite one.

If, for instance, the cyclist pulls the left hand branch of the handle bar for bringing same for instance into the position shown in Fig. 2, he causes through the connecting rod 8, the lever 10 to be raised, and said lever, by exerting a pulling action upon the corresponding part of chain 15, causes a movement of rotation of pinion 17 to take place in the direction of the arrow in Figs. 1 and 2, thus communicating an additional impulsion to the vehicle.

It is thus seen that by alternately exerting by his right hand and by his left hand a tractive movement upon the corresponding branches of the handle bar, the cyclist would be in a position to communicate to his vehicle an additional impulse to the one given by the pedals, and said impulsion can even be substituted to the action of said pedals.

A tensioning device may be provided on arm 23 in order to secure a convenient tension to the parts of chains 15, 16, thus avoiding the lateral friction of said parts. The pulley 22 may be located at any convenient place and can even, in some cases, be located on the fork 14 itself.

The shaft 12 could also be connected with the pedals shaft, said connection being effected by means of chains, connecting rods, toothed gears or the like, located either externally or internally to the bicycle frame, in order to obtain the propulsion simultaneously upon both wheels of the bicycle or only on the front wheel of said bicycle.

It is also possible to directly locate on shaft 2 of the handle bar a pinion actuating the front wheel or both wheels of the bicycle by a convenient transmission through toothed gears, chains or any other means.

The invention applies for the propulsion of vehicles such as cycles, bicycles, rolling on roads, and generally speaking, in any case where said propulsion is obtained by a movement of pedals, as for instance for nautical, aerial or other vehicles.

What I claim is:

1. In a bicycle or like vehicle, a head member, a steering fork pivoted in said head member, a head carried by said fork, a wheel journaled in said fork, a handle bar pivotally mounted on said fork head to swing about a substantially horizontal axis at right angles to the axis of said wheel, levers pivotally connected with said fork, connections between said levers and the respective ends of said handle bar, and transmission members connected with said levers and coacting with said wheel whereby the bicycle may be propelled by pivotal movement of the handle bar about said horizontal axis.

2. A bicycle or like vehicle comprising a head member, a steering fork pivoted in said head member, a head carried by said fork, a wheel journaled in said fork, a handle bar pivotally mounted on said fork head to swing about a substantially horizontal axis at right angles to the axis of said wheel, levers pivotally connected with said fork, connections between said levers and the respective ends of said handle bar, and transmission members connected with said levers and coacting with said wheel whereby the bicycle may be propelled by pivotal movement of the handle bar about said horizontal axis, said transmission means including one way clutches connected with said wheel, a transmission chain connected with the ends of the levers and passing over said clutches, and a pulley supporting the medial portion of said chain.

JACQUES PAUL SOUHART.